United States Patent

[11] 3,627,639

| [72] | Inventors | Masao Tanaka<br>Machida-shi;<br>Yoshinobu Miyamura, Sunto-gun; Fumio<br>Kato, Sunto-gun, all of Japan |
|---|---|---|
| [21] | Appl. No. | 828,332 |
| [22] | Filed | May 27, 1969 |
| [45] | Patented | Dec. 14, 1971 |
| [73] | Assignee | Kyowa Hakko Kogyo Co., Ltd.<br>Chiyoda-ku, Tokyo, Japan |
| [32] | Priority | June 5, 1968 |
| [33] | | Japan |
| [31] | | 43/38002 |

[54] PROCESS FOR PRODUCING L-ASPARAGINASE
12 Claims, No Drawings

| [52] | U.S. Cl. | 195/66 A |
|---|---|---|
| [51] | Int. Cl. | C12d 13/10 |
| [50] | Field of Search | 195/66 A |

[56] References Cited
UNITED STATES PATENTS
3,440,142  4/1969  Teller.......................... 195/66

OTHER REFERENCES
Rowley et al., Biochemical & Biophysical Research Communications, Vol. 28, No. 2, pp. 160–165 (1967).

*Primary Examiner*—Lionel M. Shapiro
*Attorney*—Craig, Antonelli and Hill

ABSTRACT: Improved yields of L-asparaginase are produced by culturing a micro-organism belonging to the genus *Serratia* under aerobic conditions in an aqueous nutrient medium in which the amount of ammonia nitrogen is controlled to a level of 10 mg./ml. or less, while using fairly large amounts of carbon source (about 1–15 percent by weight) in the medium. *Serratia marcescens* is the preferred micro-organism. The resultant purified L-asparaginase preparations have a specific activity of at least 1,500 units per mg. of protein and have shown favorable action against leukemia in the mouse.

PROCESS FOR PRODUCING L-ASPARAGINASE

This invention relates to a process for producing L-asparaginase. More particularly, it relates to a process for the production of L-asparaginase having an antitumor activity by fermentation. Even more particularly, the invention relates to a process for producing L-asparaginase by cultivating L-asparaginase-producing micro-organisms belonging to the genus *Serratia* in a suitable nutrient medium while maintaining a control on the amount of ammonia nitrogen in the medium.

Previously, the present inventors established a process for producing L-asparaginase having an antitumor effect by cultivating an L-asparaginase-producing micro-organism belonging to the genus Serratia in a liquid culture medium as a substitute for the conventional solid culture medium which had been used in the prior art (Japanese Pat. application 9116/1968, corresponding to U.S. Ser. No. 798,443, filed on Feb. 11, 1969, now abandoned). However, this process possesses the inherent problem that only a small amount of cells are formed because the culture medium employed contains a relatively low concentration of carbon source.

Accordingly, one of the objects of the present invention is to provide an improved process for the production of L-asparaginase which overcomes the disadvantages and deficiencies of the prior art methods.

Another object of the present invention is to provide a process for producing L-asparaginase by fermentation which may be carried out in an efficacious and relatively simple manner.

A further object of the invention is to provide a process for producing L-asparaginase by fermentation which may be carried out advantageously on a large scale to give a good yield of product.

A still further object of the invention is to provide L-asparaginase.

These and other objects and advantages of the present invention will become apparent to those skilled in the art from a consideration of the following specification and claims.

In accordance with the present invention, it has been found that L-asparaginase having an antitumor activity is produced in large quantities by fermentation if the amount of nitrogen in the state of ammonia ($NH_3-N$) in the culture medium is controlled properly, regardless of the concentration of carbon source in the medium. Thus, the present invention is also concerned with the production of L-asparaginase having an antitumor activity by cultivating a micro-organism belonging to the genus *Serratia* in a liquid culture medium instead of the conventional solid culture medium, as in the aforementioned patent application. Further investigations, which have led to the present invention, have shown that the antitumor L-asparaginase cells can be produced in greater yields by using a relatively high concentration of carbon source in the culture medium while properly checking the amount of nitrogen present in the form of ammonia ($NH_3-N$).

Generally speaking, when a relatively high concentration of carbon source is used in the culture medium, the other nutrients, such as a carbon source, inorganic salts and the like, are also needed in a large amount in order to maintain the growth of the micro-organism in an optimum condition. In such cases, the amount of nitrogen in the form of ammonia in the culture medium varies in dependence upon the nitrogen source (organic and inorganic materials) used together with the carbon source and the like. When the amount of nitrogen source present in the medium is large, the growth of the micro-organisms is good. However, when the cultivation is carried out by keeping the amount of ammonia nitrogen at a fixed level (10 mg./ml. or less), the formation of the desired cells is favorable.

Any of the micro-organisms belonging to the genus *Serratia* which are capable of producing L-asparaginase can be used in the present invention. However, micro-organisms belonging to *Serratia marcescens* are particularly preferred. The micro-organism is inoculated into a culture medium containing a 1-15 percent concentration of carbon source (carbohydrates such as glucose, sucrose, fructose, glycerol and the like) and further containing an appropriate amount of the nitrogen source (including organic and inorganic materials), inorganic salts and other nutrients. Thereafter, the cultivation is conducted by maintaining the amount of nitrogen in the form of ammonia in the culture medium at a concentration of 10 mg./ml. or less and preferably at 5 mg./ml. or less.

In order to show the remarkable effect of the present invention, the results of comparative tests between the process of the present invention and that according to the above-described prior patent application are shown in table 1. The analytical results given are those obtained at the completion of culturing.

TABLE 1

| Analyzed items | Process for producing L-asparaginase | | |
|---|---|---|---|
| | Process A | Process B | Process C |
| $NH_3-N$ (ammonia nitrogen) mg./ml. | Trace | 9 | Trace |
| Wet cells, mg./ml. | 16 | 65 | 44 |
| L-asparaginase activity, units/ml. | 65 | 13 | 196 |
| Specific activity of the crude enzymatic liquid, units/mg. | 18.6 | 1.05 | 27.9 |

Process A: Cultivation under aeration and with agitation for 16 hours at 30° C. in a culture medium of pH 7.0 containing 0.3% glucose, 1.0% meat extract, 1.0% peptone, 0.5% sodium chloride and 0.5% yeast extract [from Japanese Application No. 9116/1968].

Process B: Same as Process A except that the amount of glucose is 4.0% and the pH is adjusted to 7.0-8.5 with ammonia water [from Japanese Application No. 9116/1968].

Process C: Cultivation under aeration and with agitation for 36 hours at 30° C. in a culture medium containing 4.0% glucose, 2.0% meat extract, 2.0% peptone, 0.5% yeast extract and 0.5% sodium chloride. The pH of the medium is adjusted to 7.0-8.5 with sodium hydroxide [from the present invention].

As can be seen from table 1, the activity per 1 ml. of culture liquid in the present process is increased from three to four times higher than that of the previously described process. Moreover, the specific activity of the culture liquid shows an increase of 1.5 times.

The relationships between the amount of nitrogen present in the form of ammonia in the culture medium and the antitumor activity of the L-asparaginase and the specific activity thereof are shown in table 2.

TABLE 2

| Nitrogen in the form of ammonia, mg./ml. | 0 | 0.1 | 0.5 | 5.0 | 10.0 |
|---|---|---|---|---|---|
| L-asparaginase activity, units/ml. | 194 | 193 | 132 | 54 | 11 |
| Specific activity of the crude enzymatic liquid, units/mg. | 27 | 26.5 | 19.5 | 9.8 | 0.8 |

Hence, the obtained L-asparaginase preparations show an antitumor activity which is capable of completely curing an experimental leukemia of a mouse similarly as in the case of the aforementioned patent application.

Either a synthetic culture medium or a natural nutrient medium is suitable for cultivation of the strains employed in the present invention as long as it contains the essential nutrients for the growth of the strain employed. Such nutrients are well known in the art and include substances such as a carbon source, a nitrogen source, inorganic compounds and the like which are utilized by the micro-organism employed in appropriate amounts. Thus, as a carbon source, there may be mentioned, by way of example, carbohydrates such as glucose, fructose, maltose, sucrose, starch, starch hydrolysate, molasses, etc., or any other suitable carbon source such as organic acids, for example, acetic acid, lactic acid, etc. These substances may be used either singly or in mixtures of two or more. As a nitrogen source, various kinds of inorganic or organic salts or compounds, such as urea, liquid ammonia or ammonium salts such as ammonium chloride, ammonium sulfate, ammonium nitrate, ammonium acetate, ammonium phosphate, etc., or natural substances containing nitrogen, such as cornsteep liquor, yeast extract, meat extract, peptone, fish meal, bouillon, casein hydrolysates, casamino acid, fish solubles, rice bran extract, etc. may be employed. Again, these substances may be used either singly or in combinations of two or more. Inorganic compounds which may be added to the culture medium include magnesium sulfate, sodium phosphate, potassium dihydrogen phosphate, potassium monohydrogen phosphate, iron sulfate, manganese chloride, calcium chloride, sodium chloride, zinc sulfate, etc. Growth-promoting agents, such as biotin, or vitamins, such as thiamine or cobalamin, may also be added to the medium if desired or required.

The fermentation or culturing of the micro-organisms is conducted under aerobic conditions, such as aerobic shaking of the culture or with stirring and aeration of a submerged culture, at a temperature of, for example, about 20° to 40° C. and at a pH of, for example, about 6.0 to 10.0. After about 1 to 3 days of culturing under these conditions, large amounts of L-asparaginase are found to be accumulated in the resultant culture liquor.

After the completion of culturing, the L-asparaginase can be removed by conventional means, such as ion exchange resin treatment, extraction with solvents, precipitation, adsorption, chromatography or the like.

The following examples are given merely as illustrative of the present invention and are not to be considered as limiting. Unless otherwise noted, the percentages therein and throughout the application are by weight per liter of water.

EXAMPLE 1

*Serratia marcescens* ATCC–60 is cultivated in a liquid nutrient medium containing 2 percent of dry bouillon with aeration and agitation for 7 hours at 30° C. The resultant culture liquor is used as the seed culture. This seed culture is inoculated in a jar fermentor having a capacity of 5 liters in the proportion of 10 percent by volume into 3 l. of a fermentation medium having the following composition:

| | |
|---|---|
| 4.0% | glucose |
| 2.0% | peptone |
| 2.0% | meat extract |
| 0.5% | yeast extract |
| 0.5% | sodium chloride |

Culturing is then carried out at 30° C. for 36 hours at 400 r.p.m. and with aeration at the rate of 3 liters per minute. The pH of the medium is adjusted to 7.0–8.5 with calcium hydroxide. The resultant cells are separated by a centrifugal separator, whereby 210 grams of wet cells is obtained.

The cells are suspended in a 0.01 M tris-buffer solution (pH 8.5) and treated with a Sonic Oscilator (10 Kc) for 10 minutes in order to destroy the cells. A crude extract liquid having an L-asparaginase activity of 150 units/ml. and a specific activity of 25.0 units per 1 mg. of protein is obtained. This extract liquid is subjected to a nucleic acid-removing treatment with $Mn^{++}$, removal of impure proteins by heating, fractional precipitation with ammonium sulfate, chromatography with diethylaminoethyl cellulose and biogels and the like, whereby the enzymatic protein is purified to give an L-asparaginase preparation having a specific activity of 1500 units per 1 mg. of protein in a yield of about 20 percent. This preparation shows an antitumor activity which is capable of completely curing an experimental leukemia with a dosage of several 10's of $\mu g$.

EXAMPLE 2

*Serratia marcescens* ATCC 19180 is cultivated in the same manner as described in example 1 in order to prepare a seed culture. This seed culture is inoculated in a jar fermentor having a capacity of 5 liters in the proportion of 10 percent by volume into 3 liters of a fermentation medium having the following composition:

| | |
|---|---|
| 8% | glycerol |
| 3% | peptone |
| 0.25% | potassium sulfate |
| 0.05% | potassium phosphate |
| 0.05% | dipotassium phosphate |
| 0.05% | magnesium sulfate |
| 10 mg./L | ferrous sulfate |
| 10 mg./L | manganese sulfate |
| 10 mg./L | cadmium sulfate |
| 10 mg./L | copper sulfate |
| 10 mg./L | zinc sulfate |

Culturing is then carried out for 60 hours at 30° C. under aerobic conditions at 400 r.p.m. and with aeration at the rate of 3 liters per minute. The pH of the medium is adjusted to 7.0–8.5 with a 40 percent solution of sodium hydroxide. The resultant cells are separated by a centrifugal separator to obtain 360 grams of wet cells. These cells are subjected to the same treatments as described in example 1 for purifying the enzymes, whereby a preparation having a specific activity of 2000 units per 1 mg. of protein is obtained in a yield of about 20 percent. This enzymatic preparation is effective against leukemia in a mouse similarly as in example 1.

EXAMPLE 3

*Serratia marcescens* KY 4104 ATCC 13880 is cultivated in the same manner as described in example 1 in order to prepare a seed culture. This seed culture is inoculated in a fermentation tank having a capacity of 2 KL in the proportion of 10 percent by volume into 1 KL of a fermentation medium having the same composition as described in example 2. Culturing is then carried out at 30° C. for 60 hours with aerobic shaking of the culture at 100 r.p.m. and with aeration at the rate of 400 liters per minute. The pH value of the medium is adjusted to 7.0–8.5 with a 40 percent solution of potassium hydroxide during the cultivation. The resultant cells are separated by a centrifugal separator, thereby obtaining 130 kg. of wet cells.

The obtained cells are treated in the same manner as described in example 1, whereby a crude enzymatic liquid having an L-asparaginase activity of 198 units/ml. and a specific activity of 27.6 units per 1 mg. of protein is obtained. The crude liquid is further purified in the same manner as described in example 1, resulting in an L-asparaginase preparation having a specific activity of 2000 units per 1 mg. of protein in a yield of about 25 percent. This enzymatic preparation is effective against leukemia in a mouse in the same way as discussed in example 1.

The invention being thus described, it will be obvious that the same may be varied in many ways. Such variations are not to be regarded as a departure from the spirit and scope of the invention, and all such modifications as would be obvious to one skilled in the art are intended to be included herein.

What we claim is:

1. In a process for producing L-asparaginase which comprises culturing an L-asparaginase-producing micro-organism belonging to the genus *Serratia* under aerobic conditions in an aqueous nutrient medium containing about 1 to 15 percent by weight of carbon source and recovering said L-asparaginase from the resultant culture liquor, the improvement which comprises maintaining the amount of nitrogen present in the medium in the form of ammonia at 10 mg./ml. or less.

2. The process of claim 1, wherein said micro-organism is *Serratia marcescens*.

3. The process of claim 1, wherein the amount of ammonia nitrogen present in the medium is maintained at 5 mg./ml. or less.

4. The process of claim 1, wherein the pH of the nutrient medium is adjusted to 7.0 to 8.5 with an alkaline hydroxide.

5. A process for producing L-asparaginase which comprises culturing an L-asparaginase-producing micro-organism belonging to *Serratia marcescens* under aerobic conditions in an aqueous nutrient medium containing at least a carbon source in the amount of about 1 to 15 percent by weight and a nitrogen source, the amount of ammonia nitrogen in the medium being maintained at 10 mg./ml. or less, and recovering an L-asparaginase preparation from the resultant culture liquid.

6. The process of claim 5, wherein culturing is carried out at a temperature of about 20 to 40° C. and at a pH of about 6.0 to 10.0.

7. The process of claim 6, wherein said micro-organism is *Serratia marcescens* ATCC 60.

8. The process of claim 6, wherein said micro-organism is *Serratia marcescens* ATCC 19180.

9. The process of claim 6, wherein said micro-organism is *Serratia marcescens* KY 4104 ATCC 1388.

10. The process of claim 6, wherein the amount of ammonia nitrogen present in the medium is maintained at 5 mg./ml. or less.

11. The process of claim 5, wherein the pH of the nutrient medium is adjusted to 7.0 to 8.5 with an alkaline hydroxide.

12. A process for producing L-asparaginase which comprises culturing a micro-organism selected from the group consisting of *Serratia marcescens* ATCC 60, *Serratia marcescens* ATCC 19180 and *Serratia marcescens* KY 4104 ATCC 13880 under aerobic conditions in an aqueous nutrient medium containing at least from 1 to 15 percent by weight of a carbon source and a nitrogen source, the amount of ammonia nitrogen in the medium being maintained at 5 mg./ml. or less, and recovering an L-asparaginase preparation from the resultant culture liquid.

* * * * *